United States Patent [19]

Chigira

[11] Patent Number: 5,150,260
[45] Date of Patent: Sep. 22, 1992

[54] OPTICAL APPARATUS
[75] Inventor: Tatsuo Chigira, Yokohama, Japan
[73] Assignee: Canon Kabushiki Kaisha, Tokyo, Japan
[21] Appl. No.: 769,453
[22] Filed: Oct. 1, 1991
[30] Foreign Application Priority Data
  Oct. 2, 1990 [JP] Japan .................. 2-265351
[51] Int. Cl.⁵ .................................... G02B 15/00
[52] U.S. Cl. ............................ 359/694; 359/696; 359/823; 354/195.1
[58] Field of Search .......... 359/694, 696, 823, 825, 359/829, 830; 354/195.1, 286, 400

[56] References Cited
U.S. PATENT DOCUMENTS
2,746,350 5/1956 Hopkins ...................... 359/694
3,106,125 10/1963 Martin et al. ............... 359/696
5,016,993 5/1991 Akitake ........................ 359/696

Primary Examiner—Loha Ben
Attorney, Agent, or Firm—Robin, Blecker, Daley & Driscoll

[57] ABSTRACT

An optical apparatus comprises a lens holding member holding a lens, a guide member for guiding the movement of the lens holding member in the direction of the optical axis, a gear shaft rotatable by a drive source, and a moving member having a gear portion meshing with the gear shaft and movable in the direction of the optical axis by the rotation of the gear shaft to thereby move the lens holding member in the direction of the optical axis, the moving member being supported for rotation in a direction substantially orthogonal to the axial direction of the gear shaft.

16 Claims, 4 Drawing Sheets

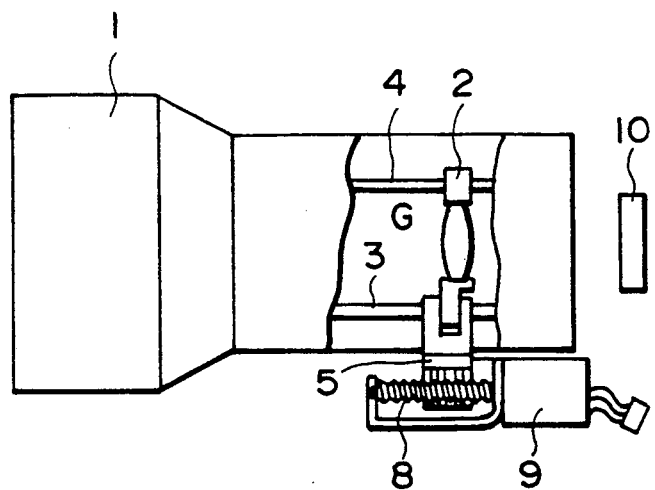
F I G. 1
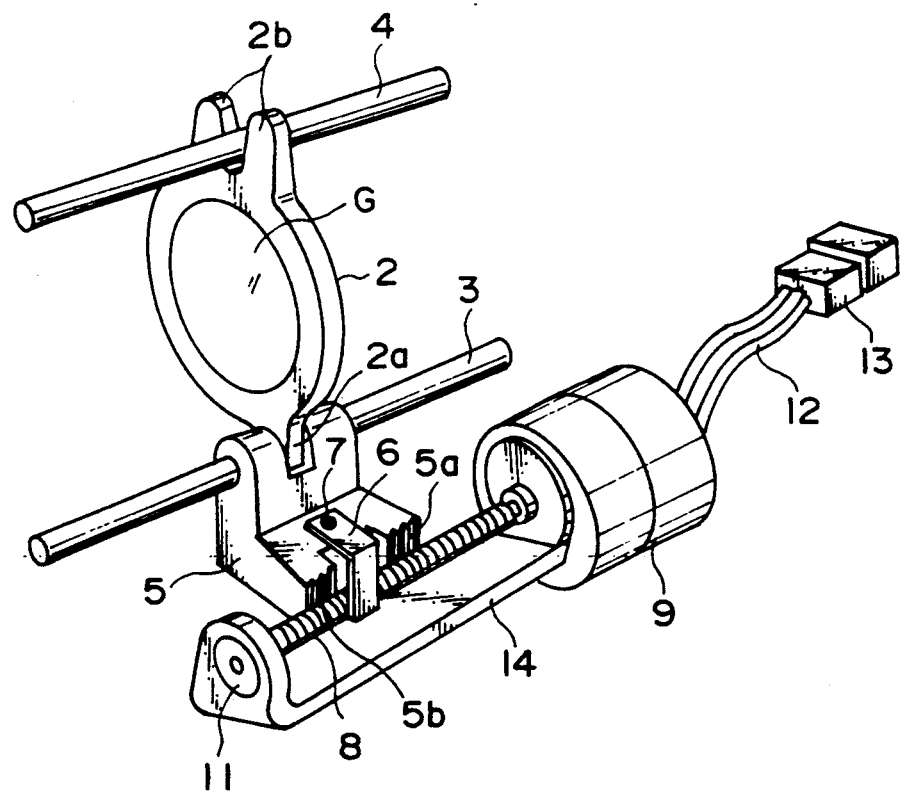
F I G. 2

OPTICAL APPARATUS

BACKGROUND OF THE INVENTION

1. Field of the Invention

This invention relates to an optical apparatus having a lens driving device.

2. Related Background Art

Auto focus mechanisms in photo-taking lenses for video cameras have heretofore included an auto focus device which emits infrared light and meters light impinging on and reflected by an object, and an auto focus mechanism which meters the contrast of light passed through a photo-taking optical system by a CCD (solid state image pickup element) and judges in-focus by the value of the contrast having reached a peak. Any of these is such that a focusing lens is driven by an actuator in accordance with instructions from a distance measuring device to thereby perform the focusing operation.

Particularly in the latter auto focus device of the contrast detection type, the combination thereof with an inner focus optical system which pursues the compactness of the optical system has often been seen in recent years. As an example of the prior art, as shown in FIG. 5 of the accompanying drawings, a focusing lens holding frame 200 is designed to be parallel-movable in the direction of the optical axis by two guide shafts 300 and 400. A rack 500 meshing with a lead screw 800 formed on the shaft of a stepping motor 900 is mounted on a portion of the lens holding frame 200.

However, according to such structure, if the two guide shafts 300 and 400 for moving the lens are not parallel to the lead screw 800 which is the shaft of the stepping motor 900, an angular movement is created in the rack 500, whereby the movement of the lens holding frame 200 becomes unsmooth. Therefore, in order to ensure the degree of parallelism of these members, it has been practised to increase the accuracy of the parts or provide a mechanism for adjustment. As a result, a long time has been required for assembly, or a highly accurate and expensive part molding machine has been necessary to increase the accuracy of the parts.

So, in order to solve such problems, there has been devised a device as disclosed in Japanese Laid-Open Utility Model Application No. 2-71155 (its corresponding U.S. Patent has not yet been ascertained).

This device is such that a rack and a lens holding frame are connected together by a flexible connecting member, and the connecting member comprises, for example, a relatively thin spring member, and is intended to have rigidity for the movement of the lens in the direction of the optical axis and to have flexibility in a direction perpendicular to the optical axis.

In this device, however, to provide sufficient flexibility, it is necessary to make the connecting member thin, and to provide sufficient rigidity in the direction of the optical axis, it is necessary to make the length of the connecting member sufficiently great in the direction of the optical axis. This has led to the problem that an optical accessory such as a lens barrel using the device disclosed in Japanese Laid-Open Utility Model Application No. 2-71155 becomes bulky.

SUMMARY OF THE INVENTION

One aspect of this invention is to provide an optical apparatus in which a lead screw rotated by a drive screw, a rack gear portion meshing with the lead screw and a biasing portion for biasing the rack gear portion toward the lead screw are provided as a lens driving device for moving a lens in the direction of the optical axis, the rack gear portion being supported for rotation in a direction substantially orthogonal to the axial direction of the lead screw, whereby the movement of the lens can be accomplished smoothly.

BRIEF DESCRIPTION OF THE DRAWINGS

FIG. 1 is a side view, partly in cross-section, showing the general construction of a first embodiment of the present invention.

FIG. 2 is a perspective view of the essential portions of FIG. 1.

DESCRIPTION OF THE PREFERRED EMBODIMENTS

Figure 3:
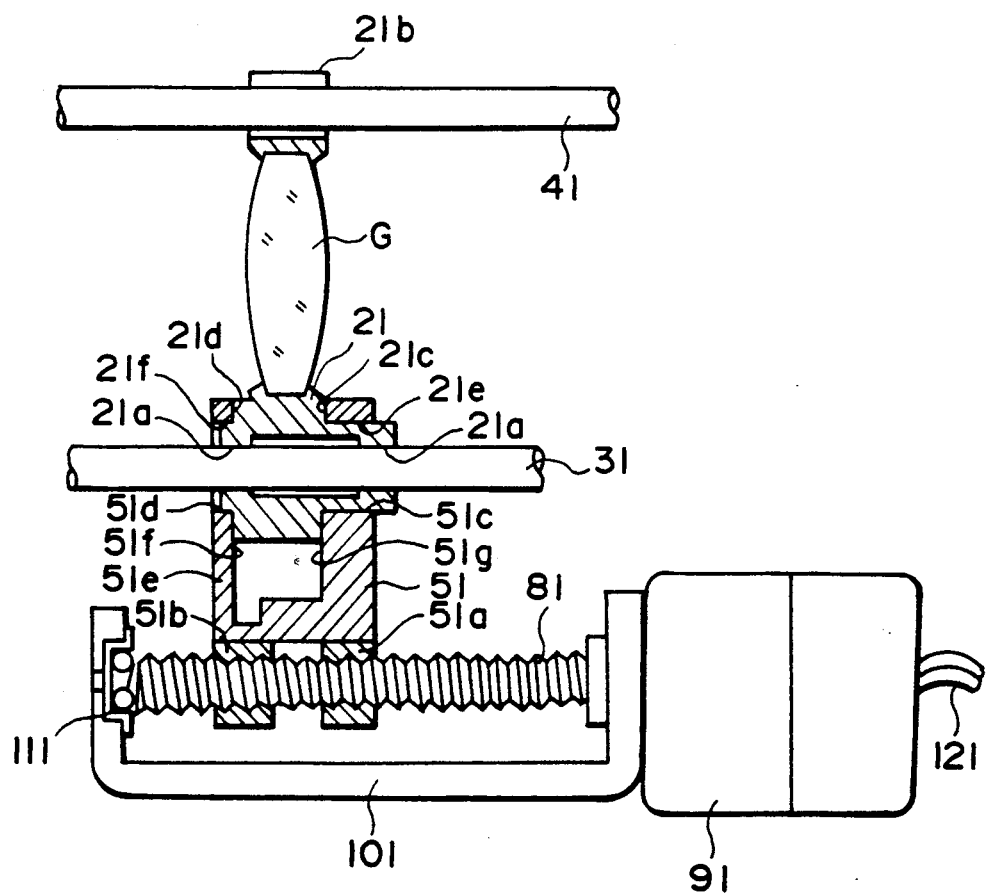
FIG. 3 is a cross-sectional view showing a second embodiment of the present invention.

Some embodiments of the present invention will hereinafter be described with reference to the drawings. FIG. 1 is a side view, partly in cross-section, for illustrating the general construction of an embodiment using a lens barrel for a video camera as an optical apparatus.

In FIG. 1, the reference numeral 1 designates a lens barrel body in which a zoom lens optical system of rear focus is contained. The reference numeral 2 denotes a focusing lens holding frame supported for movement in the direction of the optical axis relative to a guide shaft 3 parallel to the optical axis. The reference numeral 4 designates a guide shaft also parallel to the optical axis. The guide shaft 4 regulates the rotation of the lens holding frame 2. The reference numeral 5 denotes a rack meshing with a lead screw 8 which provides the output shaft of a motor 9. The reference numeral 10 designates a CCD lying at the imaging position of the optical system.

The details of a lens driving portion which is the focus mechanism portion of FIG. 1 will now be described with reference to the perspective view of FIG. 2.

In FIG. 2, the letter G designates a focusing lens held by the lens holding frame 2, which in turn is supported on the guide shaft 3 parallel to the optical axis by a sleeve portion 2a, and a U-shaped guide portion 2b has its rotation regulated by the guide shaft 4 parallel to the optical axis. The reference numeral 5 denotes a rack having rack gear portions 5a and 5b. The rack 5 embraces the right and left parts of the sleeve portion 2a of the lens holding frame 2 without any back-lash and is movable in the direction of the optical axis along the guide shaft 3 with the lens holding frame 2.

Further, an L-shaped leaf spring 6 is attached to the rack 5 by means of a screw 7, and the lead screw 8 which is a motor shaft is resiliently embraced by the rack gear portions 5a, 5b and the leaf spring 6. The thread pitch of the lead screw 8 coincides with the pitches of the rack gear portions 5a and 5b, and the rotation of the lead screw 8 moves the rack 5 in the direction of the optical axis. The reference numeral 9 designates a stepping motor for driving the focusing lens G. The stepping motor 9 has the lead screw 8 and is held by a substantially U-shaped fitting 14. A bearing 11 is secured to the substantially U-shaped fitting 14 and regulates the rotation of the lead screw 8 and the position thereof in the thrust direction. The reference numeral 12 denotes a cable for supplying electric power to the motor 9, and the reference numeral 13 designates a connector.

The operation of the present embodiment will now be described. A so-called auto focus device (not shown) for detecting the degree of blur of an image formed on the CCD 10 and instructing a focusing lens driving motor to rotate in conformity with the degree of blur and the motor 9 are coupled together by the connector 13 and the cable 12.

The lead screw 8 of the motor 9 is rotated by an amount of rotation designated by an auto focus distance measuring device. The rack portions 5a and 5b meshing with the lead screw 8 are moved axially, whereby the rack 5 sleeve-fitted to the guide shaft 3 and disposed parallel to the lead screw 8 is moved parallel to the optical axis. Further, the lens holding frame 2 is supported by the guide shaft 3 and is held between the cut-away portions of the rack 5 and therefore, can be moved in a direction parallel to the optical axis without any back-lash. On the other hand, the guide shaft 4 has its rotation regulated by the U-shaped portion 2b of the lens holding frame 2 and thus, by the rack 5 being moved in the direction of the optical axis, the focusing lens G mounted on the lens holding frame 2 is moved in the direction of the optical axis. At this time, the rack gear portion 5a and the lead screw 8 are pressed by the leaf spring 6 and therefore can mesh with each other without any back-lash. Also, the rack 5 is supported on the guide shaft 3 for movement in the direction of the optical axis and therefore, even if the degree of parallelism of the guide shaft 3 and the lead screw 8 is more or less inaccurate, the rack 5 will be rotated about the guide shaft 3, whereby an inconvenience such as being caught during movement will be prevented from occurring.

That is, even if the lead screw 8 has a degree of parallelism to the guide shafts 3 and 4 resulting in an optical performance that is more or less inaccurate, the movement of the lead screw will be affected in no way. Generally, the motor 9 is mounted after the assemblage of the optical system and thus, the motor 9 can be mounted without being adjusted in any way at that time. Of course, if the degree of parallelism of the guide shaft 3 and the lead screw 8 is greatly inaccurate, it will pose a problem, but generally, the degree of parallelism will be inaccurate by only the order of 1°-2° even if the motor is mounted without any care. For such degree of inaccuracy of the degree of parallelism, the amount of variation in the focusing lens G in the direction of the optical axis will be only sin 1°-2° and will hardly pose a problem.

Also, in the present embodiment, the center of rotation of the rack 5 and the center of holding of the lens holding frame 2 are coaxial with the guide shaft 3, but in principle, the rotary shaft of the rack 5 parallel to the optical axis may be provided on a portion of the lens holding frame 2.

FIG. 3 is a cross-sectional view showing a second embodiment of the present invention.

As shown in FIG. 3, in this embodiment, a rack 51 is not directly fitted to a guide shaft 31, but is rotatably fitted to a lens holding frame 21. The lens holding frame 21 is supported relative to the guide shaft 31 by a sleeve 21a and is parallel-movable in the direction of the optical axis. Bosses 21e and 21f are provided on the outer periphery of the sleeve 21a and are rotatably fitted to each other with the aid of holes 51c and 51d in the rack 51. That is, the rack 51 is rotatably supported relative to the lens holding frame 21. Further, the thin portion 51e of the rack 51 is resilient in the axial direction and sandwiches the surfaces 21c and 21d of the lens holding frame 21 by and between surfaces 51f and 51g so that there may not be back-lash in the axial direction. Thus, the rack 51 is free of back-lash in the direction of the optical axis relative to the lens holding frame 21, but is freely rotatable in a direction perpendicular to the optical axis. Of course, the same effect will be obtained even if a resilient member is interposed between the surfaces 51f and 21d or 51g and 21c. The rack 51 may conceivably be converse to its shown construction in its fitting and its portion fitted to the lens holding frame 21, but the degree of parallelism thereof to the optical axis may be more readily provided if the lens holding frame 21 is fitted to the guide shaft 31.

Figure 4:
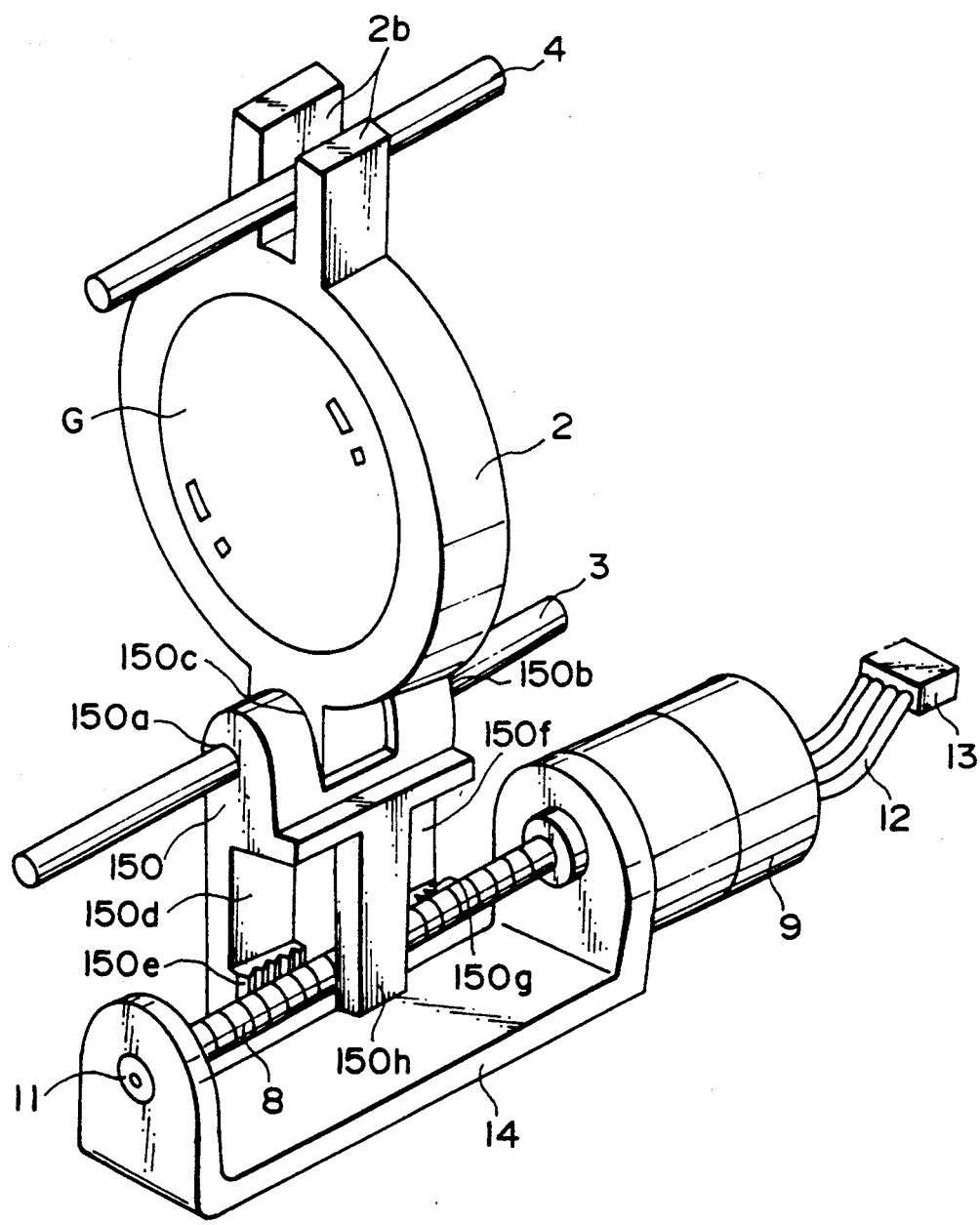
FIG. 4 is a perspective view showing a third embodiment of the present invention.
Figure 5:
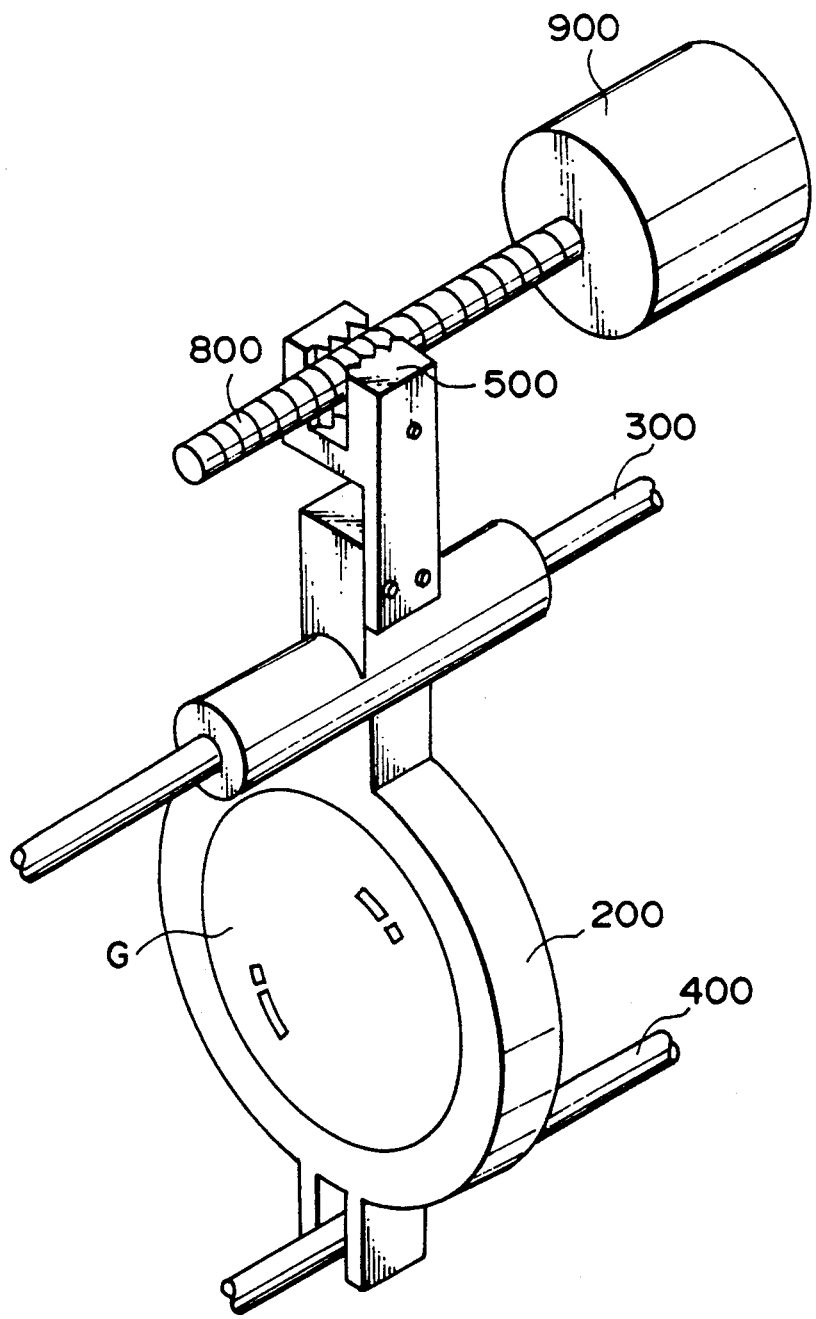
FIG. 5 is a perspective view showing a lens driving device according to the prior art.

FIG. 4 is a perspective view showing the essential portions of a third embodiment of the present invention. In FIG. 4, portions similar in construction to those of the first embodiment shown in FIGS. 1 and 2 are given similar reference characters and need not be described.

A rack 150 in this embodiment is made of a material with excellent sliding capability such as polyacetal resin and is formed with first and second holes 150a and 150b (of which the second hole 150b is not shown), and the guide shaft 3 is inserted in the first and second holes 150a and 150b. The rack 150 is also formed with a recess 150c which is of dimensions and a shape making contact with the direction of thickness of the lens holding frame 2 (the direction of the optical axis). The rack 150 is provided with first, second and third springy extensions 150d, 150f and 150h, and rack gear portions 150e and 150g are provided on the end portions of the first and second extensions 150d and 150f, respectively, and are in meshing engagement with the threads of the lead screw 8. The first, second and third extensions 150d, 150f and 150h of the rack 150 are of dimensions and a shape which nip the lead screw 8 therebetween with such a predetermined force that no back-lash occurs in the threaded portion between the rack gear portions 150e, 150g provided on the end portions of the first and second extensions and the third extension 150h.

In this embodiment, the springs nipping the lead screw 8 therebetween are formed integrally with the rack, whereby the lens can be made compact, and even when the lead screw 8 is mounted on an incline with respect to the guide shaft 3, the lead screw 8 is mounted on an incline so that for example, the spring charge force between the first extension 150d and the third extension 150h may increase, whereby the spring charge force between the second extension 150f and the third extension 150h is decreased and therefore, there can always be provided a stable back-lash eliminating force in the threaded portion.

In each of the above-described embodiments, the sleeve portion of the lens holding frame and the sleeve portion of the rack are fitted coaxially with each other and move as a unit without any back-lash in the axial direction, but the fore end of the rack is urged against the lead screw and can be moved to the focusing lens without any back-lash with respect to the rack gear portion and at the same time, the movement thereof after the assemblage can be accomplished smoothly. Further, since the rack is rotatably supported, any angular movement (any force with which the rack gear portion and the lead screw contact with and separate from each other) is not created in the rack portion. Thus, stable driving can always be accomplished.

In each of the above-described embodiments, the rack is rotatably supported on the lens holding frame itself or the guide shaft so that the guide shaft becomes a rotation center, but alternatively, the rotation center of the rack might be shifted from the guide shaft by, for example, providing another shaft to the lens holding frame.

As described above, in the optical apparatus having the lens driving device according to each of the above-described embodiments, the rack is rotatably supported in a direction substantially orthogonal to the direction of the optical axis and therefore, the creation of any angular movement to the rack can be effectively prevented and the movement of the lens holding frame can be accomplished smoothly.

Also, in each of the above-described embodiments, the rack is rotatably supported on the guide shaft which guides the lens holding frame or on the lens holding frame itself, whereby the guide shaft or the lens holding frame can serve also as a shaft for supporting the rack, and this leads to the possibility of achieving the compactness and reduced cost of the apparatus.

What is claimed is:

1. An optical apparatus comprising:
   a lens holding member holding a lens;
   a guide member for guiding the movement of said lens holding member in the direction of an optical axis;
   a gear shaft rotatable by a drive source; and
   a moving member having a gear portion meshing with said gear shaft and movable in the direction of the optical axis by the rotation of said gear shaft to thereby move said lens holding member in the direction of the optical axis, said moving member being rotatably supported in a direction substantially orthogonal to the axial direction of said gear shaft.

2. An optical apparatus according to claim 1, further comprising:
   biasing means for biasing said gear portion in said moving member to said gear shaft.

3. An optical apparatus according to claim 2, wherein a guide shaft is used as said guide member, and said moving member is rotatably supported relative to said guide shaft.

4. An optical apparatus according to claim 1, wherein a guide shaft is used as said guide member, and said moving member is rotatably supported relative to said guide shaft.

5. An optical apparatus according to claim 4, wherein said lens holding member bears against said moving member, and when said moving member is moved in the direction of the optical axis, said lens holding member is pushed thereby and moved in the direction of the optical axis.

6. An optical apparatus according to claim 1, wherein said lens holding member bears against said moving member, and when said moving member is moved in the direction of the optical axis, said lens holding member is pushed thereby and moved in the direction of the optical axis.

7. An optical apparatus according to claim 1, wherein said moving member is rotatably supported relative to said lens holding member.

8. An optical apparatus according to claim 7, wherein said lens holding member bears against said moving member, and when said moving member is moved in the direction of the optical axis, said lens holding member is pushed thereby and moved in the direction of the optical axis.

9. An optical apparatus according to claim 2, wherein said moving member is rotatably supported relative to said lens holding member.

10. An optical apparatus according to claim 2, wherein a spring is used as said biasing means, and said spring is fixed to said moving member.

11. An optical apparatus according to claim 2, wherein a spring is used as said biasing means, and said spring is formed integrally with said moving member.

12. An optical apparatus according to claim 1, wherein said moving member is formed with a plurality of gear portions, and is brought into meshing engagement with said gear shaft at a plurality of locations.

13. An optical apparatus according to claim 2, wherein said moving member is formed with a plurality of gear portions, and is brought into meshing engagement with said gear shaft at a plurality of locations, and said biasing means biases said plurality of gear portions against said gear shaft at a location between said plurality of gear portions.

14. An optical apparatus according to claim 13, wherein a spring is used as said biasing means, and said spring is fixed to said moving member.

15. An optical apparatus according to claim 13, wherein a spring is used as said biasing means, and said spring is formed integrally with said moving member.

16. An optical apparatus according to claim 1, wherein a rack is used as said moving member.

* * * * *